(12) United States Patent
Dupire et al.

(10) Patent No.: US 7,863,366 B2
(45) Date of Patent: Jan. 4, 2011

(54) CONDUCTIVE POLYOLEFINS WITH GOOD MECHANICAL PROPERTIES

(75) Inventors: Marc Dupire, Mons (BE); Janos Nagy, James (BE); Jacques Michel, Seneffe (BE); Christophe Pirlot, Petit Chapelle (BE)

(73) Assignee: Total Petrochemicals Research Feluy (BE)

( * ) Notice: Subject to any disclaimer, the term of this patent is extended or adjusted under 35 U.S.C. 154(b) by 48 days.

(21) Appl. No.: 12/332,090

(22) Filed: Dec. 10, 2008

(65) Prior Publication Data

US 2009/0221782 A1    Sep. 3, 2009

Related U.S. Application Data

(63) Continuation of application No. 10/508,637, filed as application No. PCT/EP03/02591 on Mar. 10, 2003, now abandoned.

(30) Foreign Application Priority Data

Mar. 18, 2002    (EP) .................................. 02076054

(51) Int. Cl.
*C08K 3/04* (2006.01)
*C08F 110/02* (2006.01)

(52) U.S. Cl. ...................... 524/424; 524/495; 526/352; 977/750; 977/752

(58) Field of Classification Search .................. 524/424, 524/495; 526/352; 977/750, 752
See application file for complete search history.

(56) References Cited

U.S. PATENT DOCUMENTS 6,331,265 B1 * 12/2001 Dupire et al. ............ 264/289.3

FOREIGN PATENT DOCUMENTS

EP    1052654 A1 * 11/2000

OTHER PUBLICATIONS

Chung, D.L., Comparison of submicron-diameter carbon filaments and conventional carbon fibers as fillers in composite materials, Carbon, 2001, pp. 1119-1125, vol. 39, Elsevier Science Ltd.*

* cited by examiner

*Primary Examiner*—Kriellion A Sanders
(74) *Attorney, Agent, or Firm*—Tenley R. Krueger

(57) ABSTRACT

Processes for preparing reinforced polymeric material and the materials formed therefrom are discussed herein. The processes generally include providing a polymeric matrix, providing single-wall carbon nanotubes (SWNT) or multiple-wall carbon nanotubes (MWNT), purifying by the nanotubes in a single step of dissolving a support and catalyst particles with an agent appropriate to the nature of the support to form a purified support, functionalising the purified support by reaction with an alkylamine to form a functionalized support, dispersing the nanotubes in the polymeric matrix by mixing in the molten state to form a mixture and optionally orienting the mixture by stretching.

8 Claims, 5 Drawing Sheets a)

b)

CONDUCTIVE POLYOLEFINS WITH GOOD MECHANICAL PROPERTIES

CROSS-REFERENCE TO RELATED APPLICATIONS

This application claims the benefit of U.S. patent Application Ser. No. 10/508,637, filed Aug. 15, 2005, which claims the benefit of PCT/EP2003/02591, filed Mar. 10, 2003, which claims priority from EP 02076054.2, filed Mar. 18, 2002.

The present invention is concerned with reinforced and conductive polymers incorporating nanotubes, their method of preparation and their uses.

It has been known for many years that blending fibres, such as carbon fibres, with polymers can significantly improve the mechanical properties of the blends (see Polymer Composites, April 1987, Vol. 8, No. 2, 74-81; J. Composite Materials, Vol. 3, October 1969, 732-734; and Polymer Engineering and Science, January 1971, Vol. 11, No. 1, 51-56). GB 1179569A discloses a method of reinforcing polymers by the incorporation of long fibres of material such as metal, glass or asbestos. The advantage of carbon fibres is that they are very light, but despite this exhibit relatively great mechanical strength. In particular they exhibit very high stiffness.

It has also been known for many years to disperse carbon black in polymer matrices in order to increase their electrical conductivity. The amount of carbon black filler necessary to reach the desired effect is however very high, of the order of 10 to 25 wt %, thereby reducing the mechanical and processing properties of the composite material.

More recently, since the discovery of Buckminsterfullerene ($C_{60}$), it has been found that carbon tubes (often termed carbon nanotubes because of their diminutive dimensions) having a structure related to the structure of $C_{60}$ exist, which have the potential to be used in similar ways to carbon fibres. In particular, the structure of carbon nanotubes makes their aspect ratio (length/diameter, L/D) comparable to that of long fibres. Typically the aspect ratio of carbon nanotubes can be as high as 500 or larger. Thus, the aspect ratio of carbon nanotubes is generally much greater than that of conventional short fibres, such as short glass fibres and short carbon fibres. In addition, the tubes can potentially be lighter than conventional carbon fibres, whilst being stronger and stiffer than the best conventional carbon fibres (see P. Calvert "Potential application of nanotubes" In Carbon Nanotubes, Editor T. W. Ebbeson, 297, CRC, Boca Raton, Fla. 1997).

Depending on their diameter, helicity, and number of layers (single-wall v. multiple-wall) carbon nanotubes have electronic properties between those of conductors and semi-conductors. They may thus be added to an electrically insulating polymer to increase its conductivity. WO 97/15934 discloses an electrically conductive polymer composition containing carbon nanotubes. In addition, carbon nanotubes have great mechanical strength, being cited as having bending modulus values of from 1000-5000 GPa. Moreover they have been mentioned in connection with new, highly efficient, fracture micromechanisms that would prevent pure brittle failure with a concomitant low strain. Thus, carbon nanotubes have been envisaged for use in many applications in recent years (see P. Calvert "Potential application of nanotubes" in Carbon Nanotubes, Editor T. W. Ebbeson, 297, CRC, Boca Raton, Fla. 1997; T. W. Ebbeson, "Carbon Nanotubes", Annu. Rev. Mater. Sci., 24, 235, 1994; Robert F. Service, "Super strong nanotubes show they are smart too", Science, 281, 940, 1998; and B. I. Yakobson and R. E. Smalley, "Une technologie pour le troisième millénaire: les nanotubes", La Recherche, 307, 50, 1998).

However, in the past when producing polyolefin composites by incorporating carbon nanotubes, tangling of the nanotubes and consequent randomising of the orientations of the nanotubes has caused problems (see M. S. P. Shaffer, X. Fan, A. H. Windle, "Dispersion of carbon nanotubes: polymeric analogies", poster 39, p. 317 in Proceedings of Polymer '98", September 1998, Brighton (UK); P. M. Ajayan, "Aligned carbon nanotubes in thin polymer films", Adv. Mater., 7, 489, 1995; H. D. Wagner, O. Lourie, Y. Feldman and R. Tenne, "Stress-induced fragmentation of multi-wall carbon nanotubes in a polymer matriX", Appl. Phys. Lett., 72 (2), 188, 1998; and K. Yase, N. Tanigaki, M. Kyotani, M. Yomura, K. Uchida, S. Oshima, Y. Kuriki and F. Ikazaki, Mat. Res. Soc. Symp. Proc., Vol. 359, 81, 1995). In particular, tangling can give rise to a reduction in the homogeneity of nanotubes/polymer blends since it is difficult for the nanotubes to distribute themselves evenly within the surrounding polymer matrix. This reduces the mechanical strength and the electrical conductivity of the blends, since lack of homogeneity introduces weak points in a blend at positions where, for instance, there is a relatively low concentration of nanotubes and a high concentration of polymer. Moreover the randomising of the orientation of the nanotubes also reduces the mechanical strength of the blends. This is because (for example) the maximum resistance to strain in a given direction will be achieved when all of the nanotubes in the blend are oriented with their longitudinal axes aligned in that direction. The further that a blend deviates from such an ideal orientation, the less the resistance to strain of the blend in that direction. However, up to present it has not been possible to control the orientation of the nanotubes to a degree sufficient to improve mechanical properties.

There is a need for composites that offer a good balance of electrical and mechanical properties, as well as good processing capabilities.

It is an aim of the present invention to prepare a composite material having good electrical conductivity.

It is also an aim of the present invention to prepare a composite material having good mechanical properties, particularly, good tensile properties.

It is a further aim of the present invention to produce a composite material that is easy to process.

It is yet another aim of the present invention to produce composite material having good thermal conductivity.

Accordingly, the present invention provides a polymeric material reinforced with single-wall carbon nanotubes (SWNT) or multi-wall carbon nanotubes (MWNT) and prepared by mixing in the molten state, characterised in that said carbon nanotubes are free of catalyst and support particles.

By partly purified it is meant throughout this description that the catalyst particles, if present, and the support particles, if present, are removed from the carbon nanotubes whereas the pyrolytic carbon component is retained. It is possible to prepare carbon nanotubes that are free of catalyst or support particles: in that case no purification is necessary.

The present invention also discloses a process for preparing said reinforced polymeric material that comprises the steps of:
a) providing a polymeric matrix,
b) providing partly purified carbon nanotubes,
c) dispersing the partly purified carbon nanotubes in the polymer matrix by mixing in the molten state,
d) optionally orienting the polymer/nanotubes mixture of step c) by stretching in the molten state or in solid state.

The present invention further discloses the use of said partly purified nanotubes in order to produce a reinforced polymeric material having a good balance of electrical and mechanical properties.

In the present invention, the polymer is not particularly limited. In a preferred embodiment, the polymer is preferably a polyolefin, such as a homopolymer or a copolymer of ethylene or of propylene or a blend thereof. When the polyolefin is a polymer of an olefin having 3 or more carbon atoms, such as polypropylene, the polyolefin may be atactic, isotactic or syndiotactic. Other polymers that can be used in the present invention include polyesters such as PET and PEEKS, polyamides, PVC, and polystyrenes.

Carbon nanotubes can be produced by any method known in the art. They can be produced by the catalytic decomposition of hydrocarbons, a technique that is called Catalytic Carbon Vapour Deposition (CCVD). This method produces both SWNT and MWNT: the by-products are soot and encapsulated metal(s) nanoparticles. Other methods for producing carbon nanotubes include the arc-discharge method, the plasma decomposition of hydrocarbons or the pyrolysis of selected polymers under selected oxidative conditions. The starting hydrocarbons can be acetylene, ethylene, butane, propane, ethane, methane or any other gaseous or volatile carbon-containing compound. The catalyst, if present, is either pure or dispersed on a support. The presence of a support greatly improves the selectivity of the catalysts but it contaminates the carbon nanotubes with support particles, in addition of the large amounts of soot and amorphous carbon produced by pyrolysis. A purification step therefore becomes necessary in order to obtain pure carbon nanotubes. The purification comprises two steps:
1) the dissolution of the support particles, typically carried out with an appropriate agent that depends upon the nature of the support and
2) the removal of the pyrolytic carbon component, typically based on either oxidation or reduction processes.

The second step can be prejudicial to the dispersion of the nanotubes in the matrix as it results in a partial oxidation of nanotubes, thereby modifying their polarity and consequently their ability to be mixed with apolar polymers such as polyethylene and polypropylene. It is therefore essential to control that preliminary treatment and the surface composition of the nanotubes in order to improve their dispersion in the polymer matrix and their linking properties: this is generally achieved by "functionalising" the nanotubes as described for example in J. Chen et al., Science, 282, 95-98, 1998; Y. Chen et al., J. Mater. Res., 13, 2423-2431, 1998; M.A. Hamon et al., Adv. Mater., 11, 834-840, 1999; A. Hiroki et al., J. Phys. Chem. B, 103, 8116-8121, 1999. The functionalisation can be carried out by reaction for example with an alkylamine. It results in a better separation of the nanotubes in the polypropylene matrix thereby favouring the dispersion in the polymer matrix. If the functionalisation is carried out in both the nanotubes and the polymer matrix it promotes their covalent bonding, thereby improving the electrical and mechanical properties of the filled compound.

The electrical conductivity of polymers was typically obtained by the incorporation of electrically conductive particles as filler into the polymer. The electrically conductive particles may comprise at least one of carbon black, carbon fibres, metallic particles, or particles coated with electrically conductive material.

The electrical conductivity of the composite material depends upon the concentration of the filler particles in the polymer. At low filler concentrations, the filler particles form clusters wherein the particles touch each other but the clusters are individual and separated from each other. With such a concentration range and such morphology, the composite is considered to be an electrically insulative material. However, the electrical conductivity generally increases with increasing filler concentration. With a yet further increase in the filler concentration, the particulate clusters start to touch each other, thereby forming an electrically conductive body in the polymer matrix. In a very narrow range of increasing particulate concentration, the electrical resistivity of the composite suddenly drops, and the material becomes electrically conductive. Such a concentration range is known as the "percolation threshold". Above the percolation threshold, any further increase in the filler concentration results in a further decrease of the electrical resistivity.

The concentration value at the percolation threshold depends on the type and geometry of the filler particles. For elongate filler particles, the higher the aspect ratio (or the shape factor defined as the ratio of the largest to the smallest characteristic dimensions: for a fibre, the shape ratio is L/D, the ratio of length to diameter) of the particles, the smaller the value of the concentration at the percolation threshold. For carbon black particles, the more spherical the particles, the higher the percolation threshold. In contrast, highly structured carbon black particles, i.e. particles of a complex shape, usually made from spheres merged into each other, provide composites with a much lower percolation threshold.

Carbon nanotubes as used in the present invention are characterised by a very large aspect ratio of at least 100, preferably of at least 500 and more preferably of at least 1000. The nanotubes can be either single-wall carbon nanotubes (SWNT) or multiple-wall carbon nanotubes (MWNT). SWNT contain a hollow core of up to 5 nm across and typically have a length in the range of 1 to 50 microns. MWNT contain a hollow core of up to 200 nm across, preferably, up to 100 nm and more preferably of up to 50 nm and typically they have a length in the range of 1 to 200 microns, preferably, of 1 to 100 microns and more preferably of 1 to 50 microns. Because of the large aspect ratio of the nanotubes, it is possible to obtain good conduction properties at low to moderate loading, providing that adequate dispersion in the polymer matrix can be achieved. In the prior art there is an overlap between the definitions of nanotubes and nanofibres, the nanotubes being generally considered as the small end of the range, both in length and diameter.

The functionalisation treatment may break the nanotubes lengthwise.

Carbon nanotubes are further characterised by a very high bending modulus in the range of 1000 to 5000 GPa and by a very efficient fracture micro-mechanism that prevents pure brittle failure under low strain.

In the present invention the carbon nanotubes are partly purified if necessary, i.e., if support and catalyst particles remain in the nanotubes. They are typically washed with an appropriate agent such as for example fluorhydric acid in order to remove the catalyst and the catalyst support. They can optionally be further purified to remove the pyrolytic carbon by an oxidising treatment typically carried out with $KMnO_4$. The amorphous carbon is oxidised faster than the carbon nanotubes, thereby minimising the alteration of the nanotubes' composition.

The nanotubes are then dispersed in the polymer matrix by any method that allows a thorough dispersion of the carbon nanotubes in the polymer matrix. One can cite the solution process wherein the polymer and fillers are dissolved in a solvent and thoroughly mixed followed by the evaporation of the solvent. Alternatively the dispersion of the filler can be achieved either with a Brabender internal mixer or with a twin-screw extruder or with any high shear device. Preferably, the nanotubes are dispersed by mixing in the molten state.

After optimal dispersion of the nanotubes in the polymer matrix, the properties of the filled polymer can be further improved by orienting the nanotubes within the polymer such that their longitudinal axes are more aligned with each other than would otherwise be the case. "Orienting" is intended to mean a degree of disentangling of the carbon nanotubes and/or a degree of aligning of the carbon nanotubes. Not only are the nanotubes oriented, but also the individual polymer molecules undergo a degree of orientation in the present method. Orientation of the nanotubes leads to a greater homogeneity and less tangling in the resulting blends, and a consequent significant improvement in the mechanical properties of the blends. In particular, superior tensile modulus and tenacity can be achieved by the present blends as compared with known blends, whilst still retaining a relatively high toughness and good electrical properties. The orientation can be carried out by stretching the polymer/nanotube mixture either in the solid state or in the molten state. The composites containing these aligned nanotubes have mechanical properties that are similar to those of composites containing continuous carbon fibres but they have much better processing capabilities permitting the high throughput production of high quality, complex shaped composites.

The quantity of carbon nanotubes added to a given quantity of polymer is not particularly limited. Typically less than 50% wt. of carbon nanotubes is added to the polymer. Preferably 30% wt. or less and more preferably 20% wt. or less of nanotubes is added. It is most preferred that 5% wt. or less of nanotubes is added. A very small quantity of nanotubes is capable of beneficially affecting the properties of a polymer, such that very small quantities can be used, depending on the intended use of the polymer. However, for most applications it is preferred that 0.1% wt. of nanotubes or greater is added, more preferably 1 wt % or greater.

Any additives typically introduced into polymers can be included in the present reinforced polymers, provided that the additives do not prevent the enhanced mechanical properties of the present polymer being obtained. Thus additives such as pigments, anti-oxidants, UV-protectors, lubricants, anti-acid compounds, peroxides, grafting agents and nucleating agents can be included. Carbon black can also be added to the nanotubes/polymer composition.

The reinforced composites according to the present invention can be used in applications that require electrical conductivity or dissipation of static electricity such as for example, electrically dissipative parts for automotive applications, conductive video disks, conductive textiles, stand shields for wires and cables, cable jacketing, hospital tiles, computer tapes or mine belting.

Embodiments of the present invention will now be described in the following by way of examples.

LIST OF FIGURES

EXAMPLES

Figure 1:
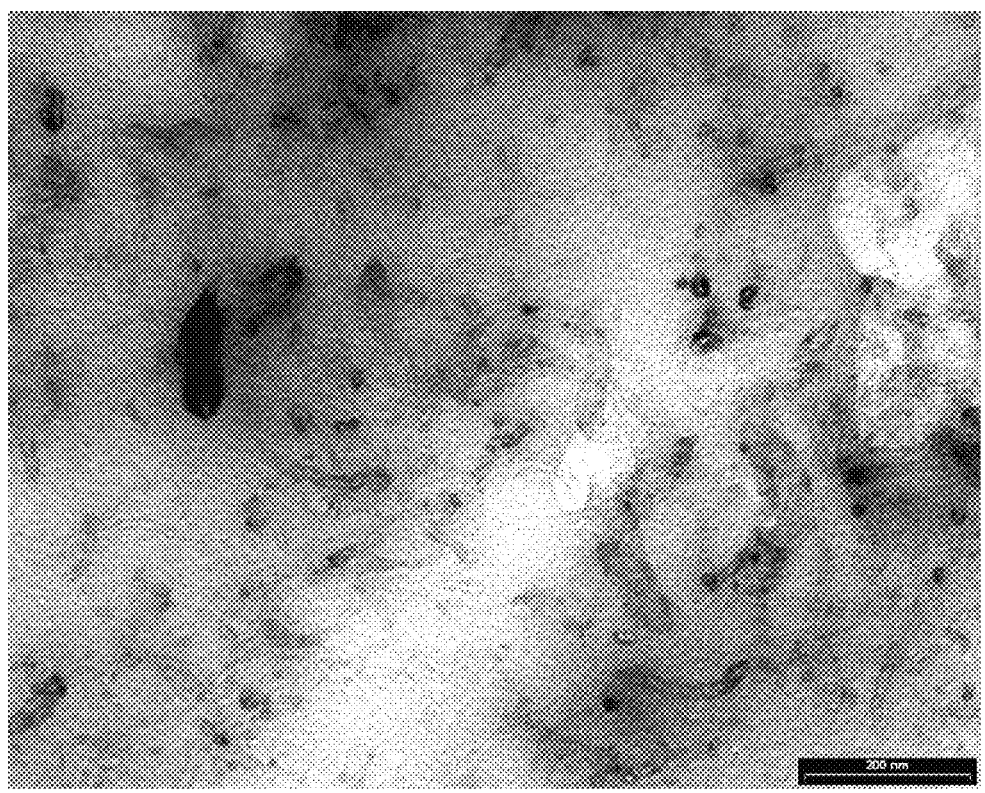
FIG. 1 represents the Transmission Electron Microscopy of multi-wall carbon nanotubes, partly purified, dispersed in a PP matrix. The filler amounts are respectively 4 wt % for (a) and 10 wt % for (b).
Figure 1:
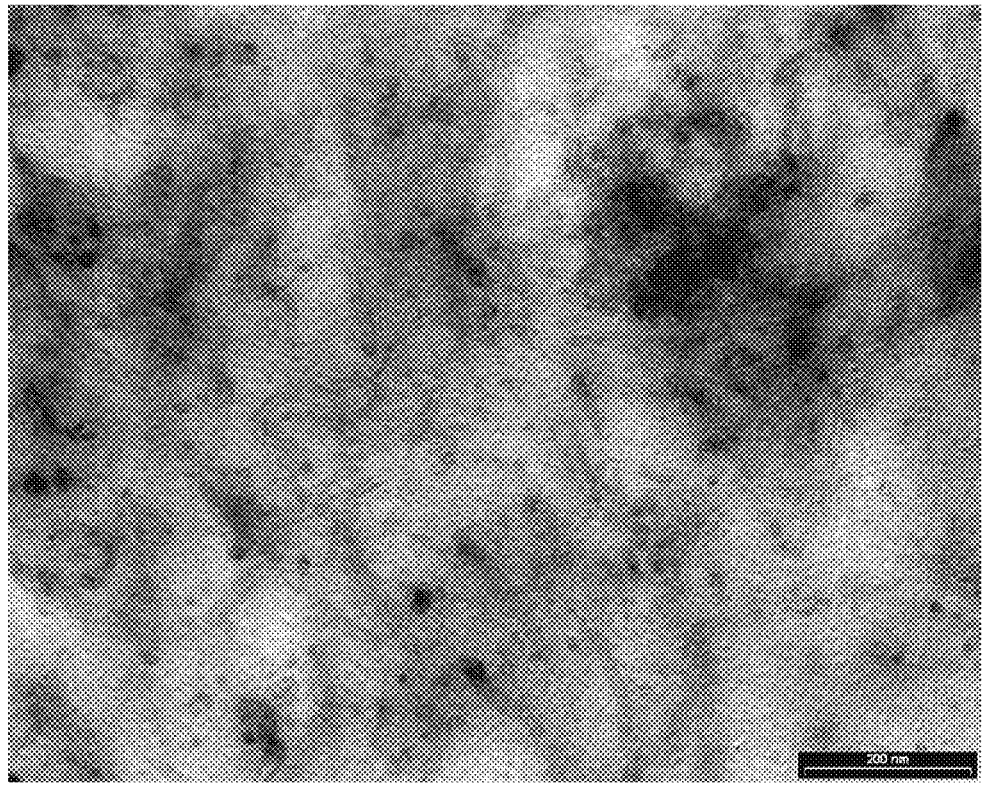

The carbon nanotubes used in the examples according to the present invention were produced by CCVD following the method of patent application no 01870150.8. They were multiple-wall carbon nanotubes having an internal diameter of about 4 nm, an external diameter of about 13 nm and a length of 10 microns; they contained on average about 13 graphitic layers. They were washed with fluorhydric acid in order to remove the catalyst and the catalyst support, while leaving the graphitic particles and amorphous carbon in place.

The polymer used was an isotactic polypropylene having a melt flow index MI2 of 35 as measured following the method of standard test ISO 1133 at a temperature of 230° C. and under a load of 2.16 kg.

The amounts of carbon nanotubes added to the polymer matrix were expressed in wt %, based on the weight of the polymer.

The following additives were also added: 1500 ppm of anti-oxidant (1 part of Irganox® 1010 and 2 parts of Irgafos® 168), 500 ppm of calcium stearate and 400 ppm of glycerol monostearate.

The isotactic polypropylene powder, the nanotubes and the additives were melt compounded using a Brabender internal mixer.

Injection moulded tensile bars were produced as follows. 1.6 g of the blended material was introduced into the mixing chamber of a MiniMax moulder, that was heated at a temperature of 220° C. The mixture was maintained at 220° C. for one minute under a nitrogen atmosphere and the axial rotor was rotated at 60 rpm for 2 minutes, resulting in further blending of the nanotubes and polypropylene.

The tensile properties of these injection-moulded bars were tested at room temperature in a MiniMat tensile machine from Rheometrics Scientific. The conditions of testing were as follows: the temperature was maintained at 23° C., the gauge length was 10 mm and the cross head speed was 10 mm/min The electrical measurements were carried out using a point contact four-point probe device having the following characteristics: the radius of the probes was 100 microns, the spacing between the probes was 1 mm, the weight was 40 mg, the current intensity was 0.01 to 50 microA and the maximum voltage was 100 V.

For comparison purposes, the isotactic polypropylene was used without filler and with various amounts of a conductive carbon black sold under the name Ensaco® 250G by Erachem Comilog. The compounding was carried out in a twin-screw extruder with 5000 ppm of the anti-oxidant described hereabove.

Polyethylene (PE) is expected to present the same behaviour as polypropylene (PP).

Figure 2:
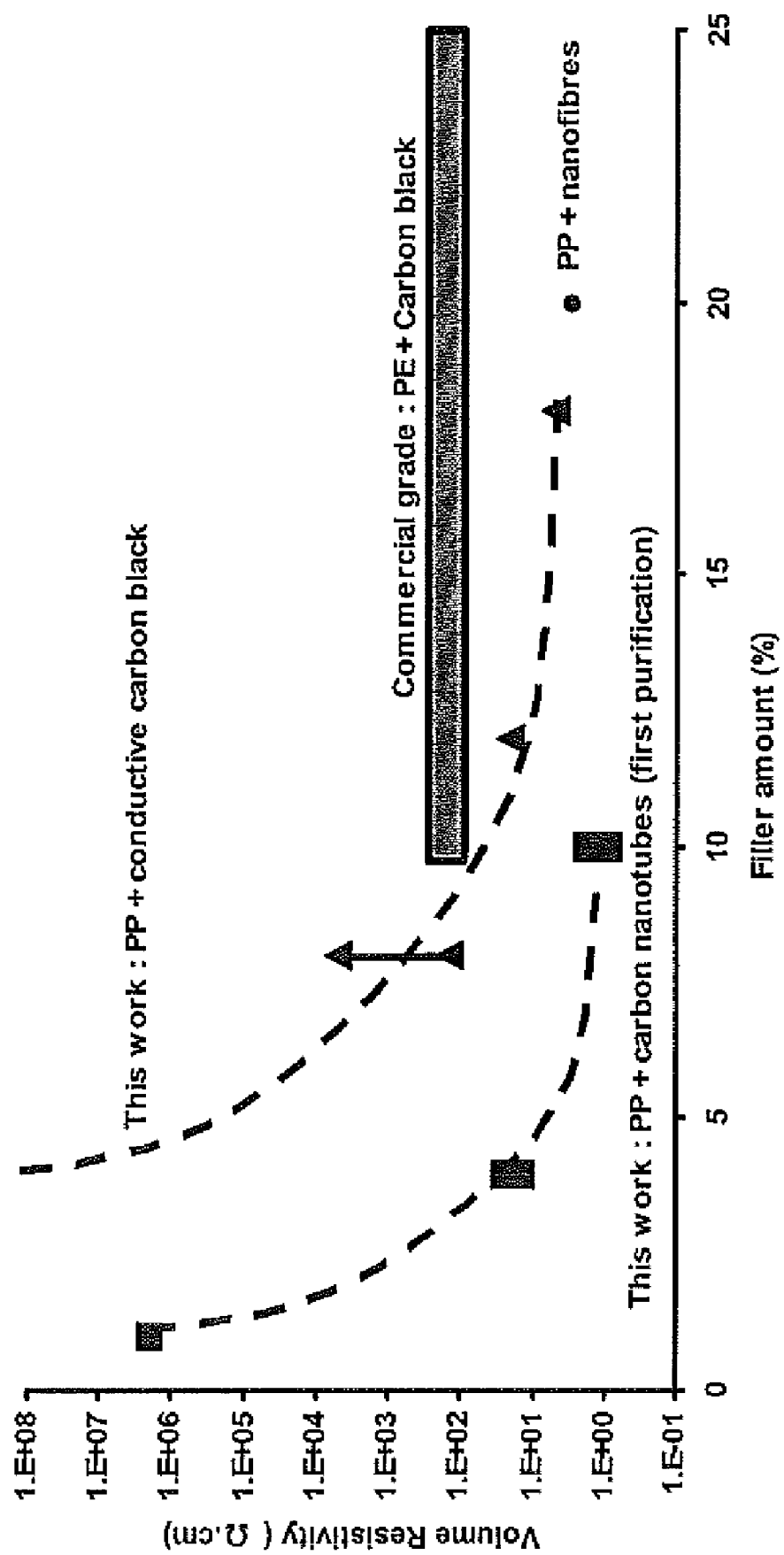
FIG. 2 represents the electrical volume resistivity expressed in $\Omega.cm$ as a function of the filler amounts expressed in wt % of filler based on the weight of the polymer for polypropylene filled respectively with carbon nanotubes, with carbon nanofibres and with carbon black and for polyethylene filled carbon black.
Figure 3:
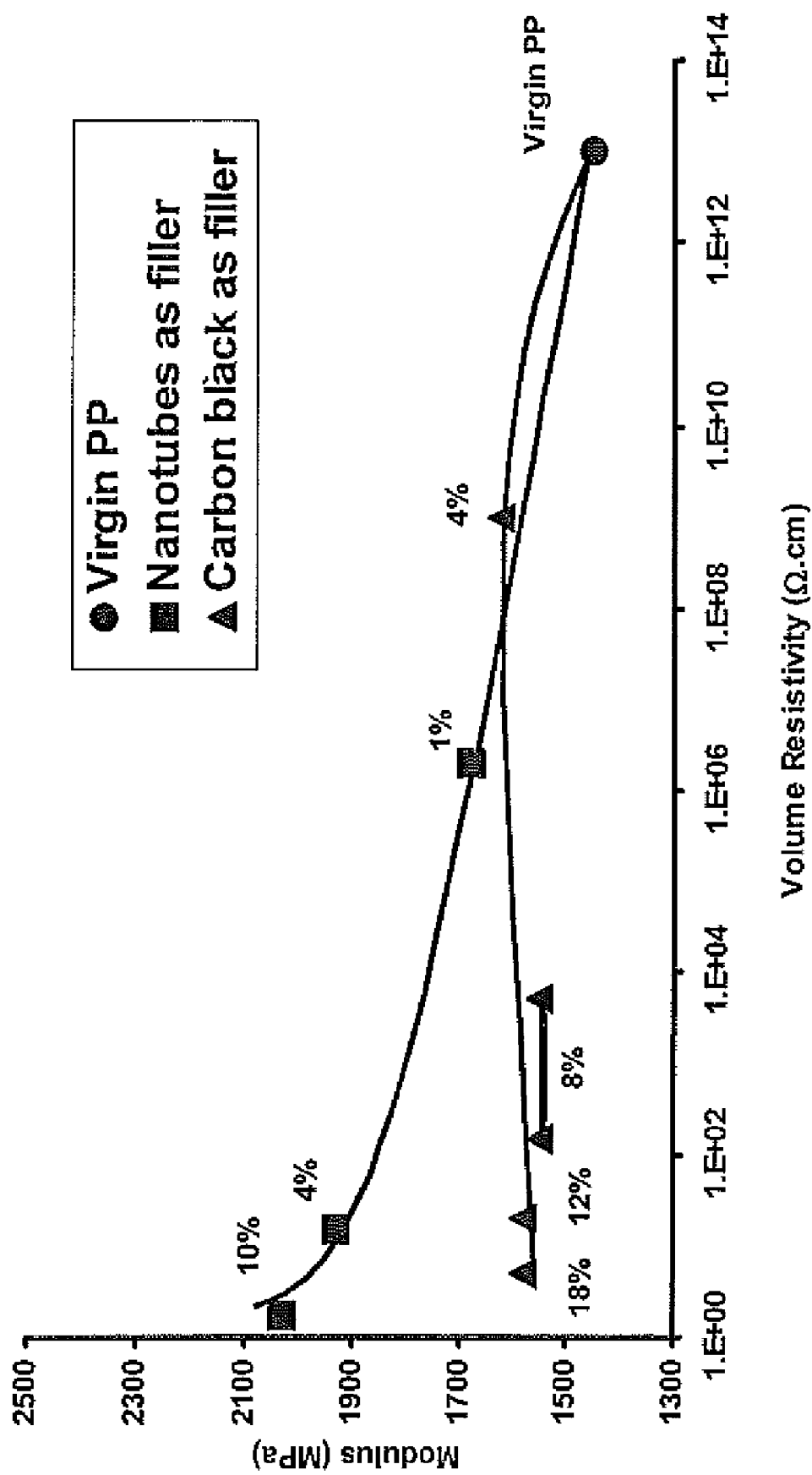
FIG. 3 represents the elastic modulus expressed in MPa as a function of the electrical volume resistivity expressed in $\Omega.cm$ for pure polypropylene and for polypropylene filled respectively with carbon nanotubes and with carbon black.

The electrical and mechanical properties of the filled polypropylene are displayed in Table I and in FIGS. 2 and 3 for various amounts and nature of fillers. The level of electrical resistivity obtained with a commercial high density polyethylene (HDPE) is also displayed on FIG. 2. For comparison, a polypropylene filled with carbon nanofibres is included in FIG. 2. The carbon nanofibres are sold under the name Pyrograph-III® by Applied Sciences, Inc. They were prepared by the vapour-grown carbon fibre (VGCF) method and had a cross section varying from 20 to 200 nm. They were purified and functionalised. Purification was conducted by refluxing in dichloromethane for 5 days at a temperature of 35° C. followed by oxidation in air at 550° C. (Lozano K., Bonilla-Rios J., Barrera E. V., J. Appl. Polymer Sc., 80, 1162-1172, 2001).

TABLE I

| Sample | Electrical volume resistivity (Ω · cm) | Elastic modulus (MPa) | Yield stress (MPa) |
|---|---|---|---|
| Unfilled | >$10^9$ | 1450 | 33.7 |
| 1% carbon nanotubes | $2.10^8$ | 116%[a] | 109% |
| 4% carbon nanotubes | 15 | 133% | .116% |
| 10% carbon nanotubes | 1.8 | 140% | 125% |
| 4% carbon black | >$10^9$ | 112% | 112% |
| 8% carbon black | 150-5000 | 107% | 103% |
| 12% carbon black | 20 | 109% | 98% |
| 18% carbon black | 5 | 109% | 91% |

[a]The properties of the different filled products are expressed in percentage with respect to the values of unfilled PP.

As can be observed from Table I and FIGS. 2 and 3 amounts of carbon nanotubes as low as 4 wt % give the filled polypropylene an electrical conductivity similar to that obtained with 12 to 18 wt % of carbon black. As a consequence, for similar electrical conductivities, the mechanical properties of the polypropylene filled with nanotubes are far superior to those of the polypropylene filled with carbon black.

Figure 4:
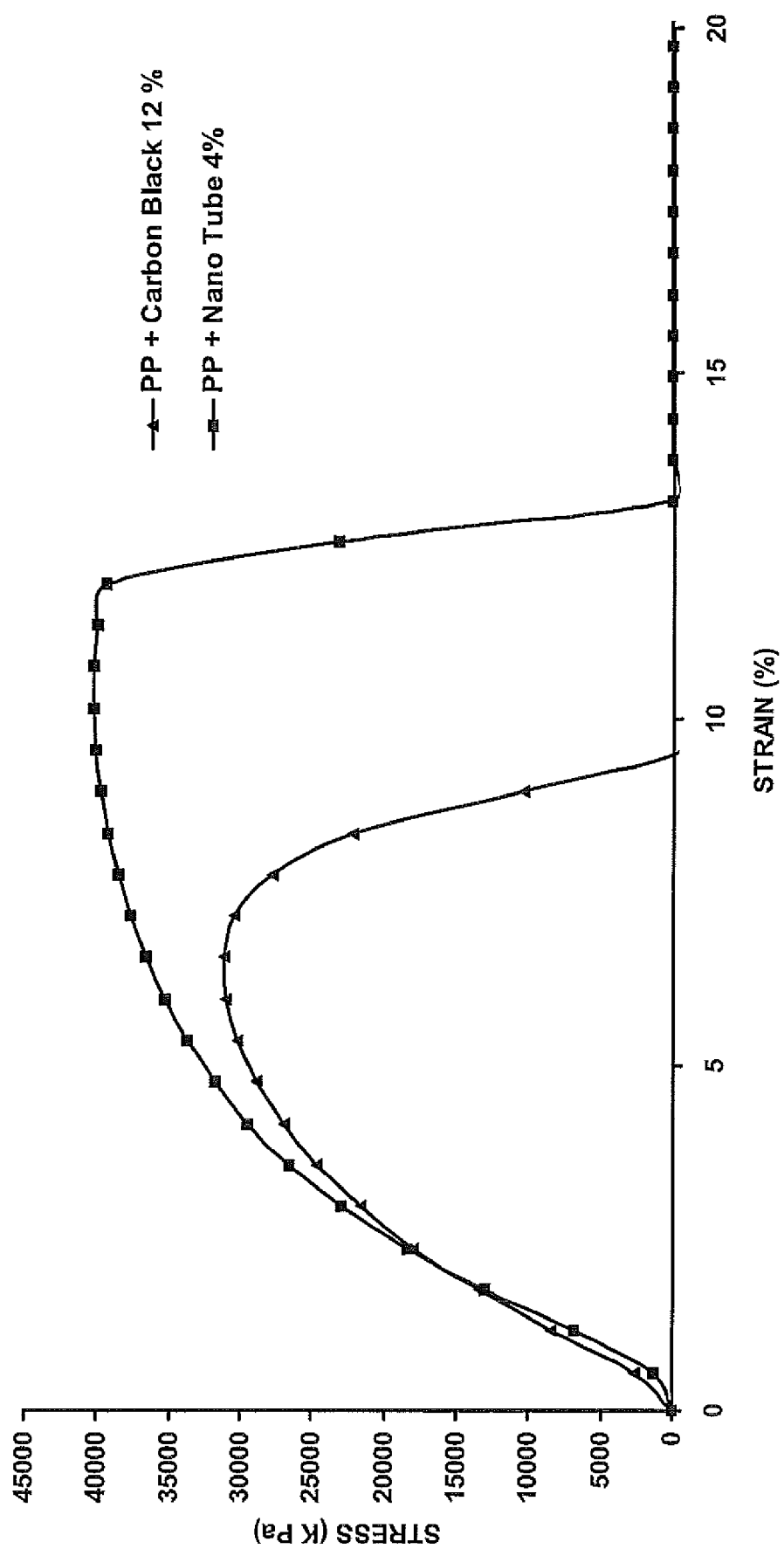
FIG. 4 represents the stress expressed in kPa as a function of the strain expressed in % respectively for polypropylene filled with 4 wt % of carbon nanotubes and for polypropylene filled with 12 wt % of carbon black.

The resilience of a product is linked to the area under its stress-strain curve. Two polypropylene composites filled respectively with 4 wt % of carbon nanotubes and with 12 wt % of carbon black and having similar electrical volume resistivities of between 15 and 20 Ω.cm have been compared for resilience. The results are displayed in FIG. 4. The areas under the stress-strain curves are respectively of $2.6.10^6$ Nm/m$^3$ for the PP filled with carbon black and of $4.10^6$ Nm/m$^3$ for the PP filled with carbon nanotubes, thus clearly showing the improved resilience of the polypropylene filled with carbon nanotubes.

The various samples filled with carbon nanotubes and with carbon black described here-above were then stretched in order to produce oriented filled composites. A first orientation was conducted by stretching the samples under slow strain rate (10%/min with a gauge length of 10 mm) at a temperature of 110° C.: the elongation was limited to a stretch ratio (SR) of 3, the stretch ratio being defined as the ratio $(L-L_0)/L_0$ wherein L and $L_0$ are respectively the lengths of the samples after and before the drawing step. The samples were then allowed to come back to room temperature. Tensile testing measurements were performed at room temperature.

The mechanical properties of the oriented samples are still further improved as can be seen by the results displayed in Table II.

TABLE II

| Sample | Elastic modulus | Yield stress |
|---|---|---|
| Unfilled not oriented | 1450 MPa | 33.7 MPa |
| Unfilled oriented | 3800 MPa | 240 MPa |
| 4% carbon nanotubes | 146%[a] | 132% |
| 10% carbon nanotubes | 225% | 175% |
| 4% carbon black | 106% | 113% |
| 8% carbon black | 125% | 115% |
| 12% carbon black | 123% | 109% |
| 18% carbon black | 121% | 98% |

[a]The properties of the different filled products are expressed in percentage with respect to the values of unfilled oriented PP.

Measurements were also carried out with polypropylene filled with fully purified carbon nanotubes. The first purification step with fluorhydric acid was followed by an oxidation step performed with KMnO$_4$. That second purification step removed all pyrolytic carbon. The conductivity measurements of the polypropylene filled with the fully purified carbon nanotubes are much lower than those obtained with the partly purified carbon nanotubes. It is further observed that the fully purified carbon nanotubes have a poor dispersion in the polymer and reduced mechanical properties. It is believed that the KMnO$_4$ treatment creates oxidised and thus polar functions at the surface of the nanotubes. It induces their limited dispersion in a hydrophobic polymer matrix, and consequently a high percolation threshold.

The compatibility of the fully purified carbon nanotubes with the polymer matrix can be improved by functionalising the carbon nanotubes using an acid/base-type reaction with an alkylamine. The amine reacts with the carboxyl functions of the nanotubes to create a pending alkyl chain that can interact with the non-polar structure. Fully purified nanotubes were re-oxidised with nitric acid, followed by reaction with octylamine: the presence of nitrogen chemically linked to the nanotubes after the functionalisation reaction was confirmed by X-Ray Photoelectron Spectroscopy. The electrical results are displayed in FIG. 5 and the electrical and mechanical results are displayed in Table III, all for the same polypropylene as in the other examples.

TABLE III

| Sample | Treatment | Electrical volume resistivity (Ωcm) | E-Modulus | Yield stress |
|---|---|---|---|---|
| unfilled |  | >$10^9$(~$10^{13}$) | 1450 MPa | 33.7 MPa |
| 4% Carbon nanotubes | Fully purified not functionalised | $20.10^6$ | 137%[a] | 114% |
| 10% Carbon nanotubes | Fully purified not functionalised | $20.10^3$ to $400.10^3$ | 137% | 103% |
| 4% Carbon nanotubes | Fully purified and functionalised | $2.10^6$ | 126% | 114% |
| 10% Carbon nanotubes | Fully purified and functionalised | 800 | 152% | 127% |

[a]The properties of the different filled products are expressed in percentage with respect to the values of unfilled PP.

Figure 5:
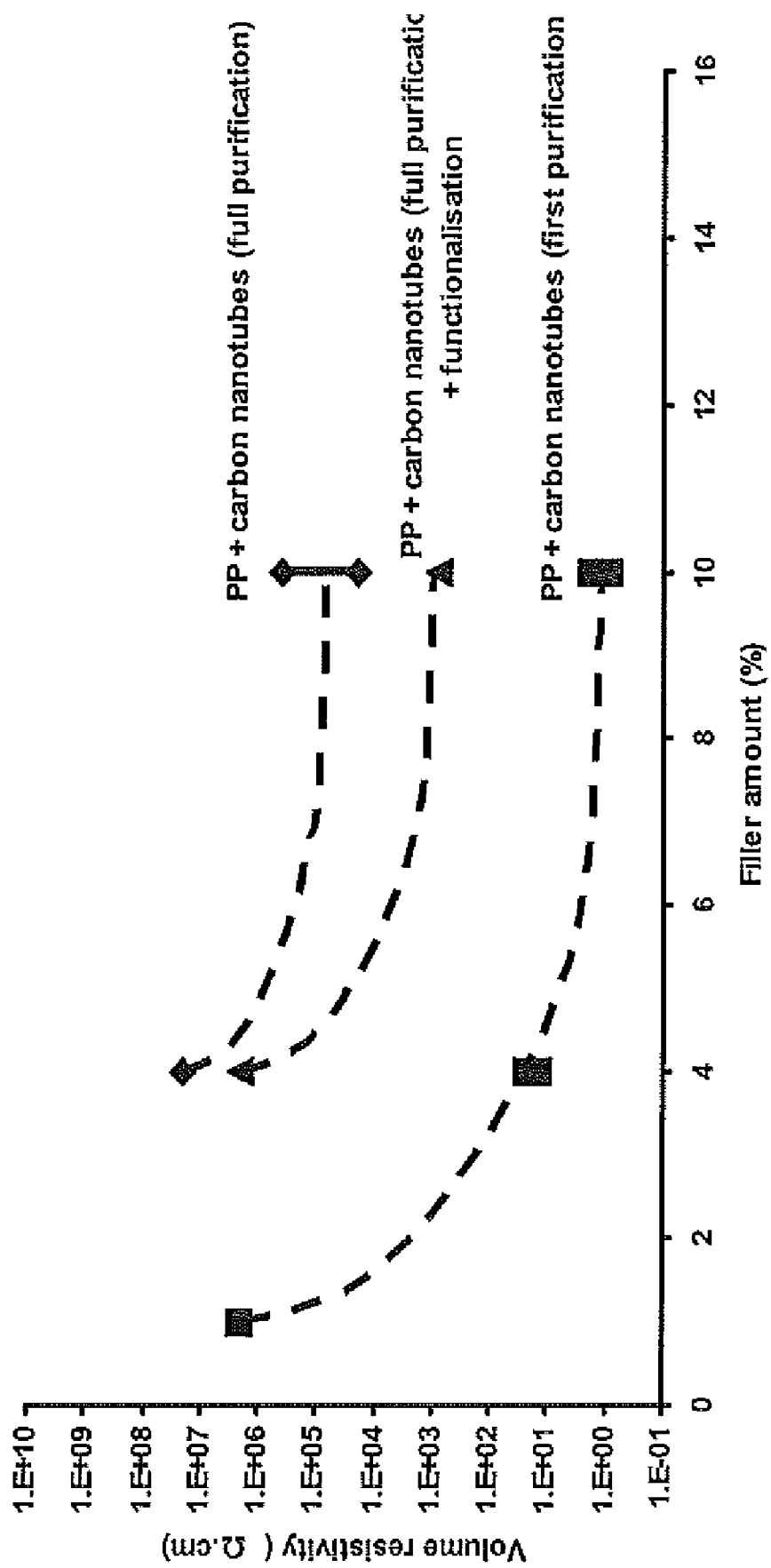
FIG. 5 represents a graph of the resistivity expressed in $\Omega.cm$ as a function of carbon nanotubes amounts expressed in wt % for partly purified nanotubes, for fully purified nanotubes and for fully purified nanotubes that have been submitted to a specific functionalising treatment described in the examples.

It is observed in FIG. 5 and in Table III that the functionalisation described here-above has improved the electrical and the mechanical behaviour of the composites filled with fully purified nanotubes. It is believed that further improvements can be obtained with other types of functionalisations.

The invention claimed is:

1. A process for preparing reinforced polymeric material comprising:
   providing a polymeric matrix;
   providing single-wall carbon nanotubes (SWNT) or multiple-wall carbon nanotubes (MWNT);
   purifying by the nanotubes in a single step of dissolving a support and catalyst particles with an agent appropriate to the nature of the support to form a purified support;
   functionalising the purified support by reaction with an alkylamine to form a functionalized support;
   dispersing the nanotubes in the polymeric matrix by mixing in the molten state to form a mixture; and
   optionally orienting the mixture by stretching.

2. An elongated polymer product formed by the process of claim 1.

3. The process of claim 1, wherein the polymeric matrix comprises a polyolefin.

4. The process of claim 3, wherein the polyolefin is a homopolymer or copolymer of ethylene.

5. The process of claim 1, wherein the carbon nanotubes have an aspect ratio of at least 100.

6. The process of claim 1, wherein the carbon nanotubes have an aspect ratio of at least 500.

7. The process of claim 1, wherein the carbon nanotubes are present in a concentration within the range of 0.1-20 wt. % of the polymeric matrix.

8. An elongated polymer product comprising a polymeric matrix material reinforced with a plurality of carbon nanotubes which are substantially free of an impurity component selected from the group consisting of catalyst particles, support particles and mixtures thereof, said reinforced polymeric material having an electrical conductivity and elastic modulus greater than the electrical conductivity and elastic modulus of a corresponding elongated polymer product formed of said polymeric matrix material reinforced with carbon black in a concentration in said polymeric matrix equal to or greater than the concentration of said carbon nanotubes in said polymeric matrix.

* * * * *